US006934728B2

(12) United States Patent
Catherwood

(10) Patent No.: US 6,934,728 B2
(45) Date of Patent: *Aug. 23, 2005

(54) EUCLIDEAN DISTANCE INSTRUCTIONS

(75) Inventor: Michael I. Catherwood, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 561 days.

This patent is subject to a terminal disclaimer.

(21) Appl. No.: 09/870,649

(22) Filed: Jun. 1, 2001

(65) Prior Publication Data

US 2002/0188639 A1 Dec. 12, 2002

(51) Int. Cl.⁷ .............................. G06F 15/00; G06F 7/52
(52) U.S. Cl. ......................................... 708/200; 708/620
(58) Field of Search .............................. 708/523, 603, 708/606, 620, 625, 200

(56) References Cited

U.S. PATENT DOCUMENTS

| | | | |
|---|---|---|---|
| 3,771,146 | A | 11/1973 | Cottton et al. |
| 3,781,810 | A | 12/1973 | Downing |
| 3,886,524 | A | 5/1975 | Appelt |
| 4,025,771 | A | 5/1977 | Lynch et al. |
| 4,074,353 | A | 2/1978 | Woods et al. |
| 4,090,250 | A | 5/1978 | Carlson et al. |
| 4,323,981 | A | 4/1982 | Nakamura |
| 4,379,338 | A | 4/1983 | Nishitani et al. |

(Continued)

FOREIGN PATENT DOCUMENTS

| | | |
|---|---|---|
| EP | 0 554 917 A2 | 8/1993 |
| EP | 0 855 843 A1 | 7/1998 |
| EP | 0 992 888 | 12/2000 |
| EP | 0 992 889 | 12/2000 |
| JP | 01037124 A | 2/1989 |
| WO | 96/11443 | 4/1996 |

OTHER PUBLICATIONS

Moon B I et al.: "A 32–bit RISC Microprocessor with DSP Functionality: Rapid Prototyping" ICICE Transactions on Fundamentals of Electronics, Communications and Computer Sciences, Institute of Electronics Information and Comm. Eng. Tokyo, JP, vol. E84–A No. 5, pp. 1339–1347, XP001060025 ISSN: 0916–8508, May 2, 2001.

Turley J: "Balancing Conflicting Requirements When Mixing RISC, DSPs" Computer Design, Pennwell Publ. Littleton, Massachusetts, IS, vol. 37, No. 10, pp. 46, 48, 50–53, XP000860706 ISSN:0010–4566, Oct. 1998.

Levy M: "Microprocessor and DSP Technologies Unite for Embedded Applications" EDN Electrical Design News, Cahners Publishing Co., Newtown Massachusetts, US, No. Europe, pp. 73–74, 76, 78–80, XP000779113 ISSN; 0012–7515, Mar. 2, 1998.

(Continued)

*Primary Examiner*—Chuong Dinh Ngo
(74) *Attorney, Agent, or Firm*—Baker Botts L.L.P.

(57) ABSTRACT

A method and processor for multiplication operation instruction processing are provided. Multiplication operation instructions are executed on source operands in data memory locations. The multiplication operation instructions are provided to perform complex multiplication operations. The multiplication operation instructions may generate the square of a multiplication source operand and generate the difference of a subtrahend source operand and a minuend source operand simultaneously. The square is output to a target accumulator specified in the multiplication operation instruction. The difference is output to a difference register specified in the multiplication operation instruction. In the alternative, the multiplication operation instructions may generate the sum of the square of multiplication source operand and an addition operand as well as generate the difference of a subtrahend source operand and a minuend source operand simultaneously. The sum is output to a target accumulator specified in the multiplication operation instruction. The difference is output to a difference register specified in the multiplication operation instruction.

22 Claims, 5 Drawing Sheets

U.S. PATENT DOCUMENTS

| | | |
|---|---|---|
| 4,398,244 A | 8/1983 | Chu et al. |
| 4,408,274 A | 10/1983 | Wheatley et al. |
| 4,451,885 A | 5/1984 | Gerson et al. |
| 4,472,788 A | 9/1984 | Yamazaki |
| 4,481,576 A | 11/1984 | Bicknell |
| 4,488,252 A | 12/1984 | Vassar |
| 4,511,990 A | 4/1985 | Hagiwara et al. |
| 4,556,938 A | 12/1985 | Parker et al. |
| 4,615,005 A | 9/1986 | Maejima et al. |
| 4,626,988 A | 12/1986 | George |
| 4,709,324 A | 11/1987 | Kloker |
| 4,730,248 A | 3/1988 | Watanabe et al. |
| 4,742,479 A | 5/1988 | Kloker et al. |
| 4,768,149 A | 8/1988 | Konopik et al. |
| 4,779,191 A | 10/1988 | Greenblatt |
| 4,782,457 A | 11/1988 | Cline |
| 4,800,524 A | 1/1989 | Roesgen |
| 4,807,172 A | 2/1989 | Nukiyama |
| 4,829,420 A | 5/1989 | Stahle |
| 4,829,460 A | 5/1989 | Ito |
| 4,839,846 A | 6/1989 | Hirose et al. |
| 4,841,468 A | 6/1989 | Miller et al. ................ 708/625 |
| 4,872,128 A | 10/1989 | Shimizu |
| 4,882,701 A | 11/1989 | Ishii |
| 4,926,371 A | 5/1990 | Vassiliadis et al. |
| 4,941,120 A | 7/1990 | Brown et al. |
| 4,943,940 A | 7/1990 | New |
| 4,945,507 A | 7/1990 | Ishida et al. |
| 4,959,776 A | 9/1990 | Deerfield et al. |
| 4,977,533 A | 12/1990 | Miyabayashi et al. |
| 4,984,213 A | 1/1991 | Abdoo et al. |
| 5,007,020 A | 4/1991 | Inskeep |
| 5,012,441 A | 4/1991 | Retter |
| 5,032,986 A | 7/1991 | Pathak et al. |
| 5,034,887 A | 7/1991 | Yasui et al. |
| 5,038,310 A | 8/1991 | Akagiri et al. |
| 5,040,178 A | 8/1991 | Lindsay et al. |
| 5,056,004 A | 10/1991 | Ohde et al. |
| 5,099,445 A | 3/1992 | Studor et al. |
| 5,101,484 A | 3/1992 | Kohn |
| 5,117,498 A | 5/1992 | Miller et al. |
| 5,121,431 A | 6/1992 | Wiener |
| 5,122,981 A | 6/1992 | Taniguchi |
| 5,155,823 A | 10/1992 | Tsue |
| 5,177,373 A | 1/1993 | Nakamura |
| 5,197,023 A | 3/1993 | Nakayama |
| 5,197,140 A | 3/1993 | Balmer |
| 5,206,940 A | 4/1993 | Murakami et al. |
| 5,212,662 A | 5/1993 | Cocanougher et al. |
| 5,239,654 A | 8/1993 | Ing-Simmons et al. |
| 5,276,634 A | 1/1994 | Suzuki et al. |
| 5,282,153 A | 1/1994 | Bartkowiak et al. |
| 5,327,543 A | 7/1994 | Miura et al. |
| 5,327,566 A | 7/1994 | Forsyth |
| 5,375,080 A | 12/1994 | Davies |
| 5,379,240 A | 1/1995 | Byrne |
| 5,386,563 A | 1/1995 | Thomas |
| 5,392,435 A | 2/1995 | Masui et al. |
| 5,418,976 A | 5/1995 | Iida |
| 5,422,805 A * | 6/1995 | McIntyre et al. ........... 708/625 |
| 5,432,943 A | 7/1995 | Mitsuishi |
| 5,448,703 A | 9/1995 | Amini et al. |
| 5,448,706 A | 9/1995 | Fleming et al. |
| 5,450,027 A | 9/1995 | Gabara |
| 5,463,749 A | 10/1995 | Wertheizer et al. |
| 5,469,377 A | 11/1995 | Amano |
| 5,471,600 A | 11/1995 | Nakamoto |
| 5,497,340 A | 3/1996 | Uramoto et al. |
| 5,499,380 A | 3/1996 | Iwata et al. |
| 5,504,916 A | 4/1996 | Murakami et al. |
| 5,517,436 A | 5/1996 | Andreas et al. |
| 5,525,874 A | 6/1996 | Mallarapu et al. |
| 5,548,544 A | 8/1996 | Matheny et al. |
| 5,561,384 A | 10/1996 | Reents et al. |
| 5,561,619 A | 10/1996 | Watanabe et al. |
| 5,564,028 A | 10/1996 | Swoboda et al. |
| 5,568,380 A | 10/1996 | Brodnax et al. |
| 5,568,412 A | 10/1996 | Han et al. |
| 5,596,760 A | 1/1997 | Ueda |
| 5,600,813 A | 2/1997 | Nakagawa et al. |
| 5,611,061 A | 3/1997 | Yasuda |
| 5,619,711 A | 4/1997 | Anderson |
| 5,623,646 A | 4/1997 | Clarke |
| 5,638,524 A | 6/1997 | Kiuchi et al. |
| 5,642,516 A | 6/1997 | Hedayat et al. |
| 5,649,146 A | 7/1997 | Riou |
| 5,651,121 A | 7/1997 | Davies |
| 5,682,339 A | 10/1997 | Tam |
| 5,689,693 A | 11/1997 | White |
| 5,694,350 A | 12/1997 | Wolrich et al. |
| 5,696,711 A | 12/1997 | Makineni |
| 5,701,493 A | 12/1997 | Jaggar |
| 5,706,460 A | 1/1998 | Craig et al. |
| 5,706,466 A | 1/1998 | Dockser |
| 5,715,470 A | 2/1998 | Asano et al. |
| 5,737,570 A | 4/1998 | Koch |
| 5,740,095 A | 4/1998 | Parant |
| 5,740,419 A | 4/1998 | Potter |
| 5,740,451 A | 4/1998 | Muraki et al. |
| 5,748,516 A | 5/1998 | Goddard et al. |
| 5,748,970 A | 5/1998 | Miyaji et al. |
| 5,764,555 A | 6/1998 | McPherson et al. |
| 5,765,216 A | 6/1998 | Weng et al. |
| 5,765,218 A | 6/1998 | Ozawa et al. |
| 5,774,711 A | 6/1998 | Henry et al. |
| 5,778,237 A | 7/1998 | Yamamoto et al. |
| 5,778,416 A | 7/1998 | Harrison et al. |
| 5,790,443 A | 8/1998 | Shen et al. |
| 5,808,926 A | 9/1998 | Gorshtein et al. |
| 5,812,439 A | 9/1998 | Hansen |
| 5,812,868 A | 9/1998 | Moyer et al. |
| 5,815,693 A | 9/1998 | McDermott et al. |
| 5,825,730 A | 10/1998 | Nishida et al. |
| 5,826,072 A | 10/1998 | Knapp et al. |
| 5,826,096 A | 10/1998 | Baxter |
| 5,828,875 A | 10/1998 | Halvarsson et al. |
| 5,862,065 A | 1/1999 | Muthusamy |
| 5,867,726 A | 2/1999 | Ohsuga et al. |
| 5,875,342 A | 2/1999 | Temple |
| 5,880,984 A | 3/1999 | Burchfiel et al. |
| 5,892,697 A | 4/1999 | Brakefield |
| 5,892,699 A | 4/1999 | Duncan et al. |
| 5,894,428 A | 4/1999 | Harada |
| 5,900,683 A | 5/1999 | Rinehart et al. |
| 5,909,385 A | 6/1999 | Nishiyama et al. |
| 5,917,741 A | 6/1999 | Ng |
| 5,918,252 A | 6/1999 | Chen et al. |
| 5,930,159 A | 7/1999 | Wong |
| 5,930,503 A | 7/1999 | Drees |
| 5,936,870 A | 8/1999 | Im |
| 5,937,199 A | 8/1999 | Temple |
| 5,938,759 A | 8/1999 | Kamijo |
| 5,941,940 A | 8/1999 | Prasad et al. |
| 5,943,249 A | 8/1999 | Handlogten |
| 5,944,816 A | 8/1999 | Dutton et al. |
| 5,951,627 A | 9/1999 | Kiamilev et al. |
| 5,951,679 A | 9/1999 | Anderson et al. |
| 5,978,825 A | 11/1999 | Divine et al. |
| 5,983,333 A | 11/1999 | Kolagotla et al. |
| 5,991,787 A | 11/1999 | Abel et al. |
| 5,991,868 A | 11/1999 | Kamiyama et al. |

| | | |
|---|---|---|
| 5,996,067 A | 11/1999 | White |
| 6,009,454 A | 12/1999 | Dummermuth |
| 6,014,723 A | 1/2000 | Tremblay et al. |
| 6,018,757 A | 1/2000 | Wong |
| 6,026,489 A | 2/2000 | Wachi et al. |
| 6,044,392 A | 3/2000 | Anderson et al. |
| 6,044,434 A | 3/2000 | Oliver |
| 6,049,858 A | 4/2000 | Kolagotla et al. |
| 6,058,409 A | 5/2000 | Kozaki et al. |
| 6,058,410 A | 5/2000 | Sharangpani |
| 6,058,464 A | 5/2000 | Taylor |
| 6,061,711 A | 5/2000 | Song et al. |
| 6,061,780 A | 5/2000 | Shippey et al. |
| 6,061,783 A | 5/2000 | Harriman |
| 6,076,154 A | 6/2000 | Van Eijndhoven et al. |
| 6,084,880 A | 7/2000 | Bailey et al. |
| 6,101,521 A | 8/2000 | Kosiec |
| 6,101,599 A | 8/2000 | Wright et al. |
| 6,115,732 A | 9/2000 | Oberman et al. |
| 6,128,728 A | 10/2000 | Dowling |
| 6,134,574 A | 10/2000 | Oberman et al. |
| 6,144,980 A | 11/2000 | Oberman |
| 6,145,049 A | 11/2000 | Wong |
| 6,181,151 B1 | 1/2001 | Wasson |
| 6,202,163 B1 | 3/2001 | Gabzdyl et al. |
| 6,292,866 B1 | 9/2001 | Zaiki et al. |
| 6,295,574 B1 | 9/2001 | MacDonald |
| 6,315,200 B1 | 11/2001 | Silverbrook et al. |
| 6,356,970 B1 | 3/2002 | Killian et al. |
| 6,377,619 B1 | 4/2002 | Denk et al. |
| 6,397,318 B1 | 5/2002 | Peh |
| 6,412,081 B1 | 6/2002 | Koscal et al. |
| 6,487,654 B2 | 11/2002 | Dowling |
| 6,523,108 B1 | 2/2003 | James et al. |
| 6,564,238 B1 | 5/2003 | Kim et al. |
| 6,633,970 B1 | 10/2003 | Clift et al. |
| 6,658,578 B1 | 12/2003 | Laurenti et al. |
| 6,681,280 B1 | 1/2004 | Miyake et al. |
| 6,694,398 B1 | 2/2004 | Zhao et al. |
| 6,751,742 B1 | 6/2004 | Duhault et al. |
| 6,763,478 B1 | 7/2004 | Bui |
| 2002/0194466 A1 | 12/2002 | Catherwood et al. |
| 2003/0093656 A1 | 5/2003 | Masse et al. |

OTHER PUBLICATIONS

Intel, Pentium Processor Family Developer's Manual, vol. 3: Architecture and Programming Manual, , pp. 3–1, 3–2, 3–15, 14–1 to 14–30, 18–7, and 25–289 to 25–292, 1995.

Intel, Embedded Intel486 Processor Family Developer's Manual, pp. 2–2, 3–17, 3–37, 4–5, 4–6, 10–1 to 10–12, 12–1 to 12–10, Oct. 1997.

Moore, M "Z80 Family Interrupt Structure", Barleywood (online), retrieved from the Internet <URL:http://www.gaby.de/z80/1653.htm>, 1997.

PCT Search Report based on PCT/US02/16706, 6 pages, Mailed Sep. 27, 2002.

PCT Search Report based on PCT/US02/16705, 7 pages, Mailed Sep. 9, 2002.

PCT Search Report based on PCT/US02/16921, 4 pages, Mailed Oct. 18, 2002.

* cited by examiner

Multiplication Operation Instructions

| SYNTAX | ENCODING | | | | | DESCRIPTION |
|--------|----------|--|--|--|--|-------------|
| ED | 1111 | 11mm | A1xx | 00ii | iijj  jjii | computes $(A-B)^2$ |
| EDAC | 1111 | 11mm | A1xx | 00ii | iijj  jjaa | computes $(A-B)^2 + C$ |

M bits- specifies register containing multiplication source operand
A bit- specifies destination location for square result
i bits- specifies register containing a difference operand, such as minuend
j bits- specifies register containing a difference operand, such as subtrahend
x bits- specifies destination location for difference result

FIG. 5

EUCLIDEAN DISTANCE INSTRUCTIONS

BACKGROUND OF THE INVENTION

1. Field of the Invention

The present invention relates to systems and methods for instruction processing and, more particularly, to systems and methods for providing multiplication computation instruction processing, pursuant to which the difference of two values transferred directly from a memory location in memory to an execution unit are squared.

2. Description of Prior Art

Processors, including microprocessors, digital signal processors and microcontrollers, operate by running software programs that are embodied in one or more series of instructions stored in a memory. The processors run the software by fetching instructions from the series of instructions, decoding the instructions and executing the instructions. Processors, including digital signal processors, are conventionally adept at processing instructions that perform mathematical computations on integers specified as a data word. For example, some processors are adept at performing simple mathematical computation, such as sum and difference operations, while others are adept at performing complex computations, such as multiplicative operations. In general, mathematical operations are performed by mathematical execution units in accordance with a set of mathematical instructions. Various mathematical instructions in the set of mathematical instruction are responsible for the performance of various aspects of the mathematical operation. The mathematical operation instructions specify the memory locations of a set of source operands contained in memory upon which to perform the mathematical operation. Typically, the set of source operands is transferred from the memory locations to registers prior to execution of the mathematical operation by appropriate mathematical execution units. These mathematical operations make inefficient use of processor resources and tend to reduce the performance of the processor. The inefficiency is due to the number of instructions required to perform a mathematical operation as well as the transference of the set of source operands from the memory locations in memory to registers inorder to perform the mathematical operation.

One such mathematical operation is an Euclidean distance operation, pursuant to which the difference of two operands is squared and the difference of two operands is calculated. Conventionally, this instruction would have to be implemented using a series of mathematical instructions. For example, a separate instruction would be required to calculate the difference of two operands, square the difference of the two operands, and store the square of the difference of the two operands. In addition, the two operands would be transferred from each of their respective memory locations in memory to registers prior to execution of the mathematical operations instructions by appropriate mathematical execution units. This technique requires multiple processor cycles and mathematical instructions, and accordingly, is inefficient.

There is a need for a new method of implementing mathematical operations within a processor that makes efficient use of processor cycles. There is a further need for a new method of implementing mathematical operations using a reduced number of mathematical instructions. There is also a need for a new method of implementing mathematical operations that transfer operands directly from data memory to mathematical execution units. There is a need for a new method of implementing mathematical operations that concurrently employs processor MCU ALU execution unit and DSP multiplier execution unit resources.

SUMMARY OF THE INVENTION

According to embodiments of the present invention, a method and a processor for processing mathematical operation instructions are provided. There are two mathematical operation instructions, each for fetching source operands directly from data memory and registers for immediate execution by appropriate mathematical execution units. In addition, each mathematical operation instruction performs a difference and multiplication operation simultaneously concurrently employing mathematical execution units. The instructions may specify the location of the source operands as well as a destination location for results of mathematical operations. These instructions may be executed in one processor cycle employing mathematical operation logic provided within the processor.

According to an embodiment of the present invention, a method of processing a multiplication operation instruction includes fetching and decoding a multiplication operation instruction. The method further includes executing the multiplication operation instruction on a multiplication source operand to generate a square of the multiplication source operand. A multiplication source operand register specified in the multiplication operation instruction contains the multiplication operand. The method further includes storing a result in a target accumulator specified in the multiplication operation instruction. The multiplication source operand is transferred directly from the multiplication operand source register to a multiplication execution unit for immediate generation of the square of the multiplication operand. The method further includes setting an accumulator status flag during the execution of the multiplication operation instruction.

According to another embodiment of the present invention, a method of processing a multiplication operation instruction includes generating a difference output between a minuend source operand and a subtrahend source operand and storing the difference output in a difference register specified in the multiplication operation instruction. The minuend operand and the subtrahend operand are fetched during execution of the multiplication operation instruction. The multiplication operation instruction specifies a first source register containing an address for the minuend operand in data memory and a second source register containing the address of the subtrahend operand in data memory. The minuend operand and subtrahend operand may be transferred directly from the address locations in memory to an arithmetic execution unit for immediate generation of the difference. The multiplication operation instruction may be an Euclidean Distance operation, where the result of the operation is the square of the multiplication source operand. Alternatively, the multiplication operation instruction may be an Euclidean Distance Accumulate operation, where the result of the operation is the sum of the square of the multiplication source operand and an addition operand.

According to another embodiment of the present invention, a method of processing a multiplication operation instruction includes modifying the address contained in the first source register to contain an address for a next minuend operand for computing a difference during execution of a subsequent multiplication operation instruction. The method further includes modifying the address contained in the second source register to contain an address for a next subtrahend operand for computing the difference during execution of the subsequent multiplication operation instruction.

According to an embodiment of the present invention, a processor for performing multiplication operation instructions includes a program memory for storing a multiplication operation instruction, a program counter for identifying current instructions for processing, and a Digital Signal Processing unit (DSP) and ALU for executing the multiplication operation instructions within the program memory. The DSP unit includes DSP logic for executing the multiplication operation instruction on a multiplication source operand to generate a square of the multiplication source operand. The multiplication source operand is contained in a multiplication source operand register specified in the multiplication operation instruction. A target accumulator stores a result output. The target accumulator is specified in the multiplication operation instruction. The multiplication source operand is transferred directly from the multiplication source operand register to a multiplication execution unit for immediate generation of the square of the multiplication source operand.

BRIEF DESCRIPTION OF THE DRAWINGS

The above described features and advantages of the present invention will be more fully appreciated with reference to the detailed description and appended figures in which:

FIG. 5 depicts a table of mathematical operation instructions according to embodiments of the present invention.

DETAILED DESCRIPTION OF THE INVENTION

According to embodiments of the present invention, a method and a processor for processing mathematical operation instructions are provided. There are two mathematical operation instructions, each for fetching source operands directly from data memory and registers for immediate execution by appropriate mathematical execution units. In addition, each mathematical operation instruction performs a difference and multiplication operation simultaneously, concurrently employing mathematical execution units. In addition, the instructions may specify the location of the source operands as well as destination locations for results. These instructions may be executed in one processor cycle employing mathematical operation logic provided within the processor. These instructions may improve performance over conventional techniques by several times.

Figure 1:
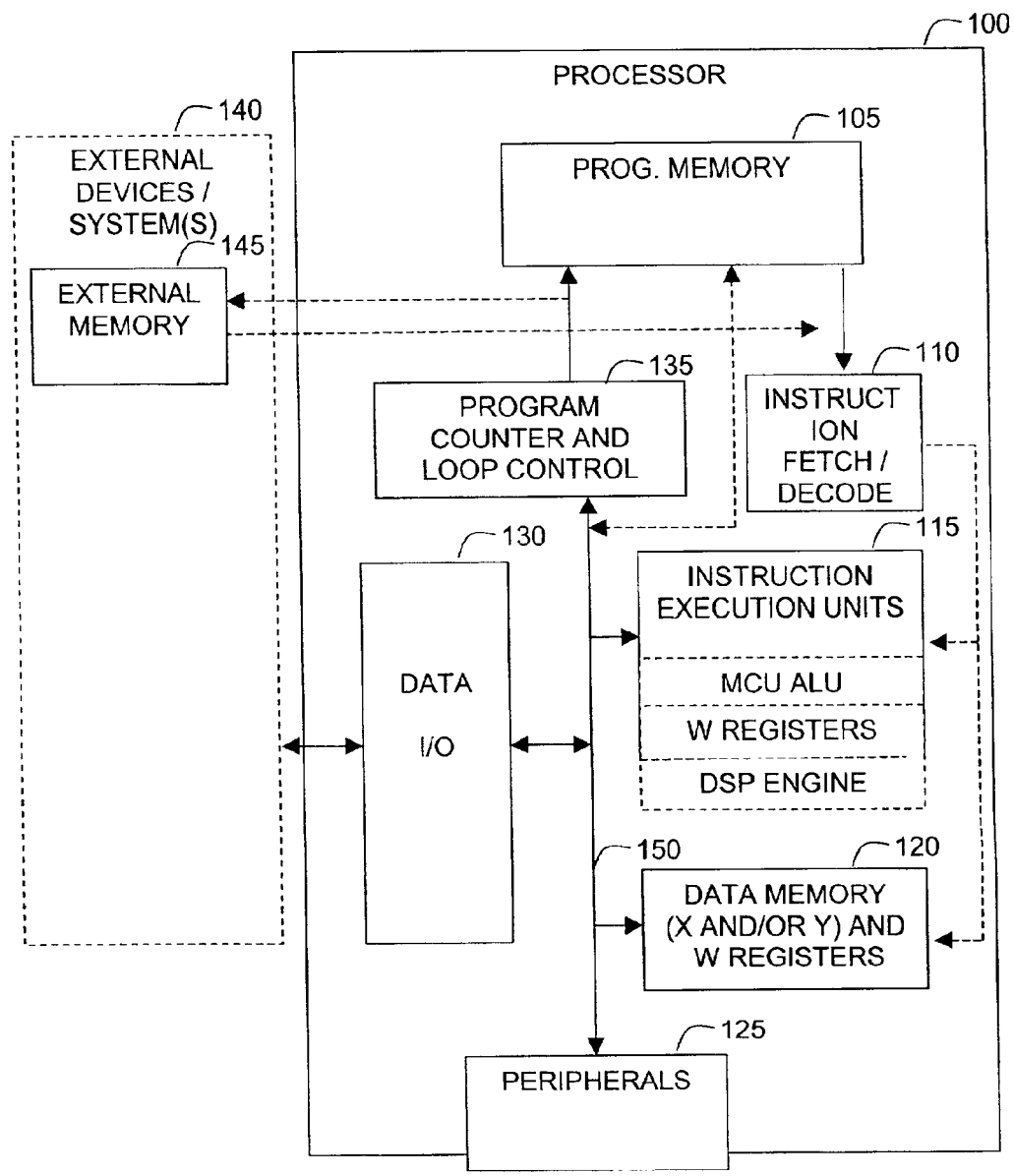
FIG. 1 depicts a functional block diagram of an embodiment of a processor chip within which embodiments of the present invention may find application.
Figure 2:
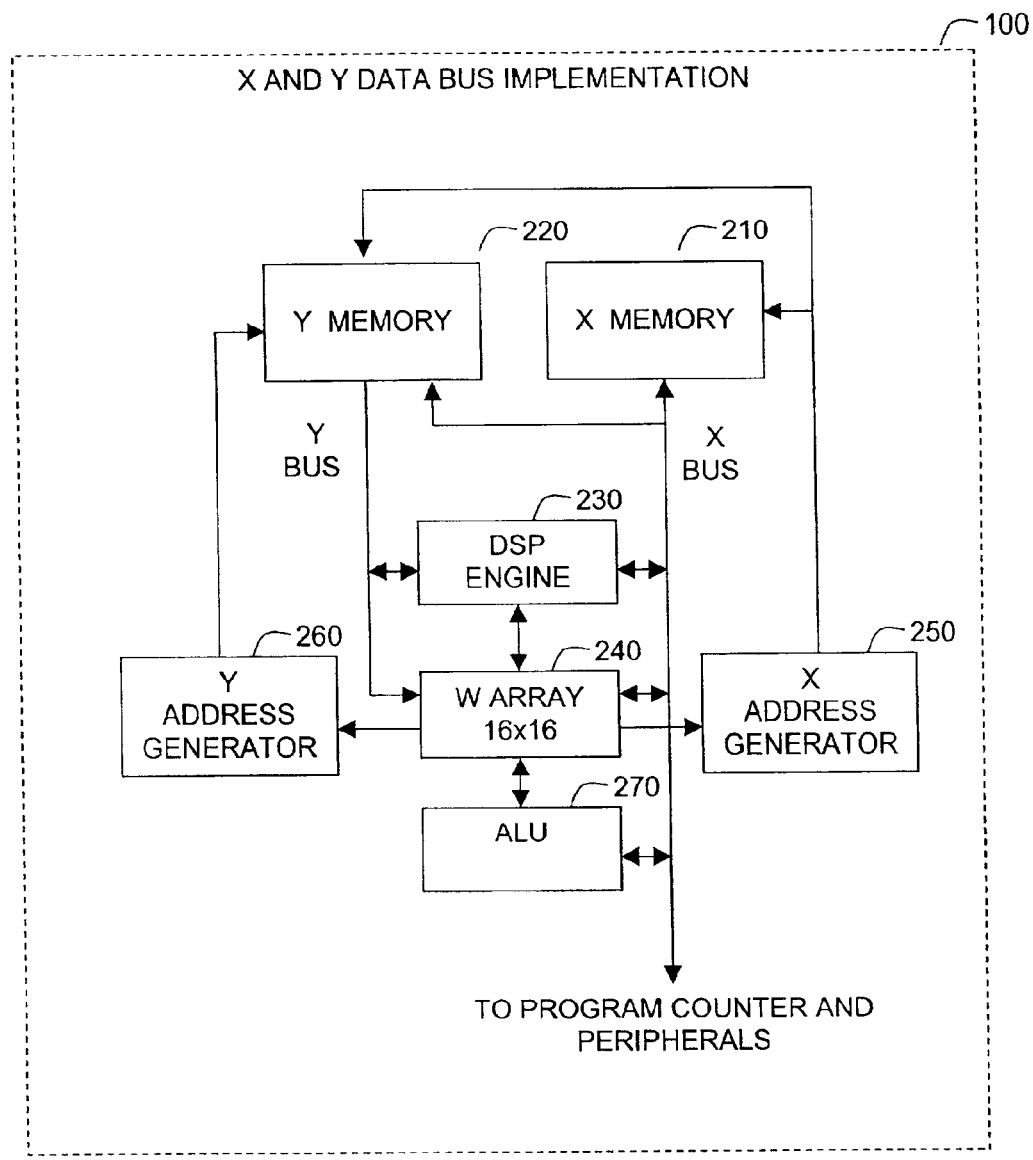
FIG. 2 depicts a functional block diagram of a data busing scheme for use in a processor, which has a microcontroller and a digital signal processing engine, within which embodiments of the present invention may find application.

In order to describe embodiments of mathematical operation instruction processing, an overview of pertinent processor elements is first presented with reference to FIGS. 1 and 2. The mathematical operation instructions and instruction processing are then described more particularly with reference to FIGS. 3–5.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of nonvolatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded mathematical instructions from the instruction fetch/decode unit 110 and thereafter execute the decoded mathematical instructions. As part of this process, the execution units may retrieve a set of source operands via the bus 150 from data memory and registers 120. During instruction processing, such as mathematical operation instructions, the set of source operands may be fetched from data memory and registers 120 as specified in the mathematical operation instructions. The set of set of source operands may be transferred from the data memory and registers 120 to registers prior to delivery to the execution units for processing. Alternatively, the set of source operands may be delivered directly from the data memory and registers 120 to the execution units for processing. Execution units may also produce outputs to registers and/or the data memory 120. The execution units may include an arithmetic logic unit (ALU) such as those typically found in a microcontroller. The execution units may also include a digital signal processing engine including a multiply and accumulate unit (MAC), a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 125. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

| | |
|---|---|
| Q1: | Fetch Instruction |
| Q2: | Fetch Instruction |
| Q3: | Fetch Instruction |
| Q4: | Latch Instruction into prefetch register, Increment PC |

The following sequence of events may comprise, for example, the execute instruction cycle for a single operand instruction:

| | |
|---|---|
| Q1: | latch instruction into IR, decode and determine addresses of operand data |
| Q2: | fetch operand |
| Q3: | execute function specified by instruction and calculate destination address for data |
| Q4: | write result to destination |

The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

| | |
|---|---|
| Q1: | latch instruction into IR, decode and determine addresses of operand data |
| Q2: | pre-fetch operands into specified registers, execute operation in instruction |
| Q3: | execute operation in instruction, calculate destination address for data |
| Q4: | complete execution, write result to destination |

Mathematical Operation Instruction Processing

Figure 3:
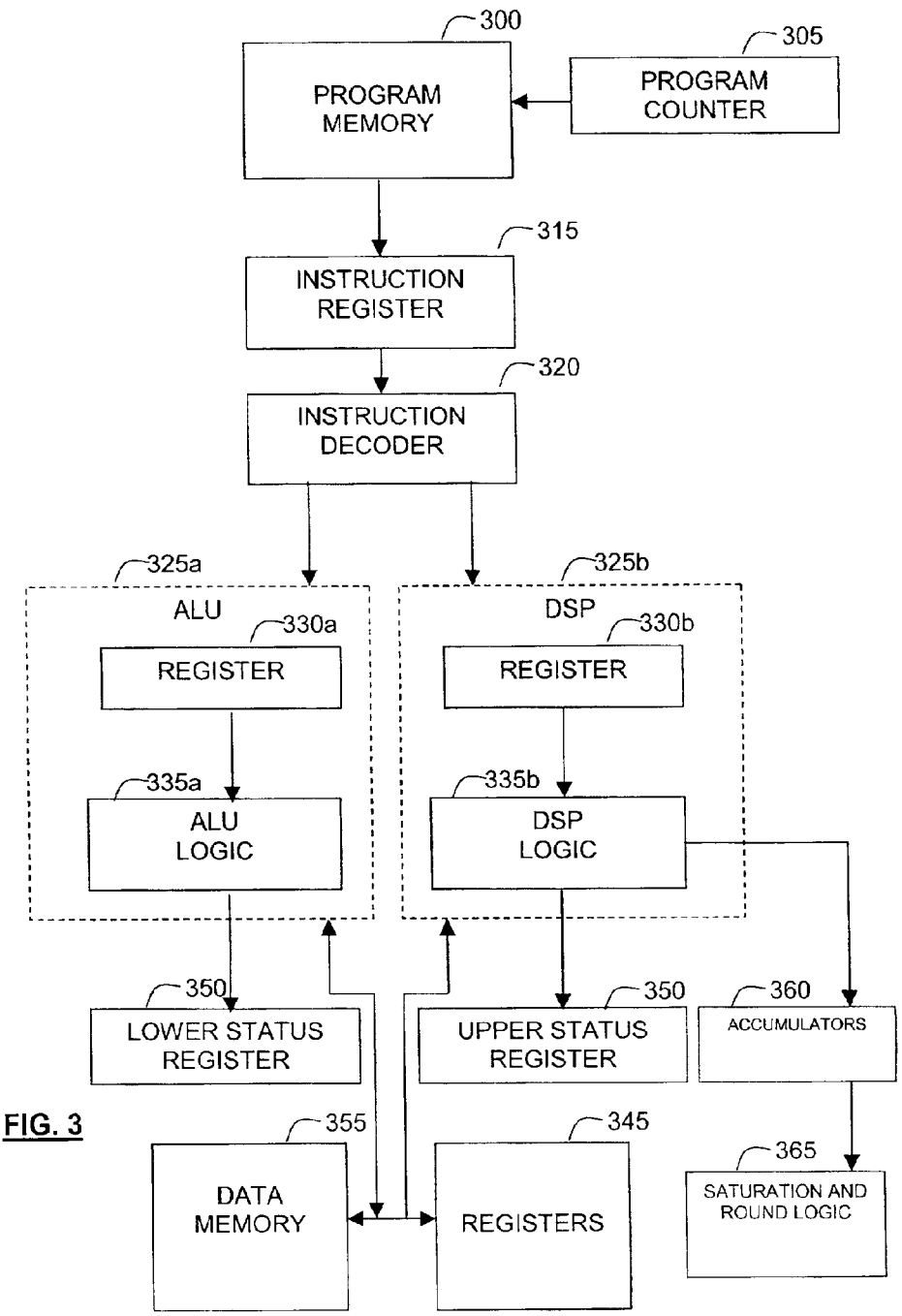
FIG. 3 depicts a functional block diagram of a processor configuration for processing mathematical operation instructions according to embodiments of the present invention.

FIG. 3 depicts a functional block diagram of a processor for processing a mathematical operation instruction according to an embodiment of the present invention. Referring to FIG. 3, the processor includes a program memory 300 for storing instructions such as the mathematical operation instructions depicted in FIG. 5. The processor also includes a program counter 305 which stores a pointer to the next program instruction that is to be fetched. The processor further includes an instruction register 315 for storing an instruction for execution that has been fetched from the program memory 300. The processor also includes an instruction decoder 320, an arithmetic logic unit (ALU) 325a, a DSP unit 325b, registers 345, a status register 350 and accumulators 360.

Registers 345 contain data that the processor generates and employs during processing mathematical operation instructions. The registers 345 may include a set of 16-bit W registers defined for mathematical operation instructions. The set of W registers may contain data including an operand and an effective address of an operand in data memory 355. The effective address of an operand in memory can be specified as an address or an address plus an offset. The effective addresses contained in W registers may be modified by a constant value following the execution of a mathematical operation instruction by execution units. Operands contained in W registers may be transferred directly to execution units, such as the DSP unit 325b and ALU unit 325a, for processing in accordance with a mathematical operation instruction. Processing of operands by DSP unit 325b and ALU unit 325a is performed concurrently. The direct transfer of operands and concurrent processing of operands by DSP unit 325b and ALU unit 325b saves processor cycles and resources.

Accumulators 360 contain data generated and produced by the DSP unit 325b as output during execution of a mathematical operation instruction. For example, each of the accumulators can contain the output of an executed square mathematical operation instruction. The Accumulators may be two 40-bit accumulators, one of which is specified by bits in the mathematical operation instruction as a target accumulator for output produced by the DSP unit 325b.

Status register 350 contains status bits that indicate the status of processor elements and operations. Status register 350 may be a 16-bit status register. The status register 350 may be separated into a lower segment and an upper segment. The processor operations for which status may be indicated include MCU ALU, DSP Adder/Subtractor, repeat, and Do loop. The processor elements for which status may be indicated include accumulators. A set of bits in the status register 350 can indicate the overflow and saturation status of accumulators due to DSP Adder/Subtractor operations.

The overflow statuses indicated include accumulator A overflowed into guard bits, and accumulator B overflowed into guard bits. The overflow status bits are modified each time data interacts with the DSP Adder/Subtractor. When the overflow status bits are set, such as with a value of 1, they indicate the most recent mathematical operation has overflowed into guard bits of an accumulator. The saturation statuses indicated include accumulator A saturated, and accumulator B saturated. The saturation status bits are modified each time data interacts with the DSP Adder/Subtractor and may be cleared by a programmer. When the saturation status bits are set, such as with a value of 1, they indicate that the accumulator has overflowed its maximum range.

The instruction decoder 320 decodes mathematical operation instructions that are stored in the instruction register 315. Based on the bits in the mathematical operation instruction, the instruction decoder 320 selectively activates logic within the ALU 325a and DSP 325b for fetching source operands, performing the specified operation on the source operands, and returning the outputs to appropriate memory location. The instruction decoder 320 decodes particular bits in the mathematical instructions and sends control signals to the ALU 325a and DSP 325b which direct the fetching of the correct source operands specified by operand register bits in the instruction, direct the activation of the correct portion of the ALU logic 335a and DSP logic 335b to carry out the mathematical operation specified by mathematical operation bits in the instruction on the correct source operands, and direct the outputs the mathematical operation to be written to the correct destinations specified by the destination bits in the instruction.

The ALU unit 325a and DSP unit 325b can include registers 330a–330b that receive operands from the registers 345 and/or a data memory 355 depending on the addressing mode used in the instruction. For example in one addressing mode, source operands may be stored in the registers 345 and fed directly to ALU unit 325a and DSP unit 325b for processing. In another addressing mode, the source operands may be stored in the data memory 355. Alternatively, some source operands may be stored in registers 345 while others may be stored in the data memory 355.

The ALU unit 325a includes ALU logic 335a which can receive inputs from the registers 330b, directly from registers 345 or directly from data memory 355, and produces outputs to the registers 345. The ALU logic 335 executes arithmetic and logic operations, specified by control signals based on bits in a mathematical operation instruction decoded by the instruction decoder, on operands fetched from the registers 345 and/or from the data memory 355. In addition, ALU unit 325a produces outputs to the registers 345, specified by control signals based on destination bits in the instruction decoded by the instruction decoder. In general, the ALU unit 325b processes data in byte or word widths.

The DSP unit 325b includes DSP logic 335b, which can receive inputs from the registers 330b and/or directly from registers 345 or data memory 355 and produces outputs to accumulators 360. The DSP logic 335b executes multiplicative and logic operations, specified by control signals based on bits in a mathematical operation instructions decoded by the instruction decoder on operands fetched from the registers 345 and/or from the data memory 355. In addition, the DSP unit 325a produces an output to a target accumulator, specified by control signals based on destination bits in the instruction decoded by the instruction decoder.

ALU logic 335a and DSP logic 335b are logically separated and are activated upon the execution of one of the mathematical operation instructions shown in FIG. 5. In this regard, when a mathematical operation instruction, such as one of those depicted in FIG. 5, is present in the instruction decoder 320, the instruction decoder generates control signals which cause the ALU unit and DSP unit to fetch the specified source operands from the registers 345 or from the data memory 355 and which cause the DSP logic 335b and ALU logic 335a to operate on the fetched source operands to produce outputs in accordance with the instruction. The outputs depend upon the instruction executed and the source operands. After generating the outputs, the instruction decoder causes the outputs to be written into the correct registers 345, memory locations within the data memory 355, and/or a target accumulator 360.

The logic may include logic for implementing two different mathematical operation instructions such as those depicted in FIG. 5. Each of these instructions performs a square operation and a difference operation on source operands whose location is specified by source register bits in the mathematical operation instruction as indicated in the table of FIG. 5. Each instruction produces outputs to destination locations specified by destination bits in the mathematical instruction. The logic for implementing each instruction is selectively activated by the instruction decoder 320 when that particular instruction is decoded.

Saturation logic 365 determines the saturation and overflow status of accumulators 360. In this regard, during execution of a mathematical operation the saturation logic analyzes a set of bits for the target accumulator to determine if the mathematical operation performed in accordance with the mathematical operation instruction has produced an output that overflowed into guard bits of the accumulator and/or overflowed the maximum range for the accumulator. Based on the analysis, overflow and saturation status bits may be set to indicate the overflow and saturation status of the target accumulator.

Figure 4:
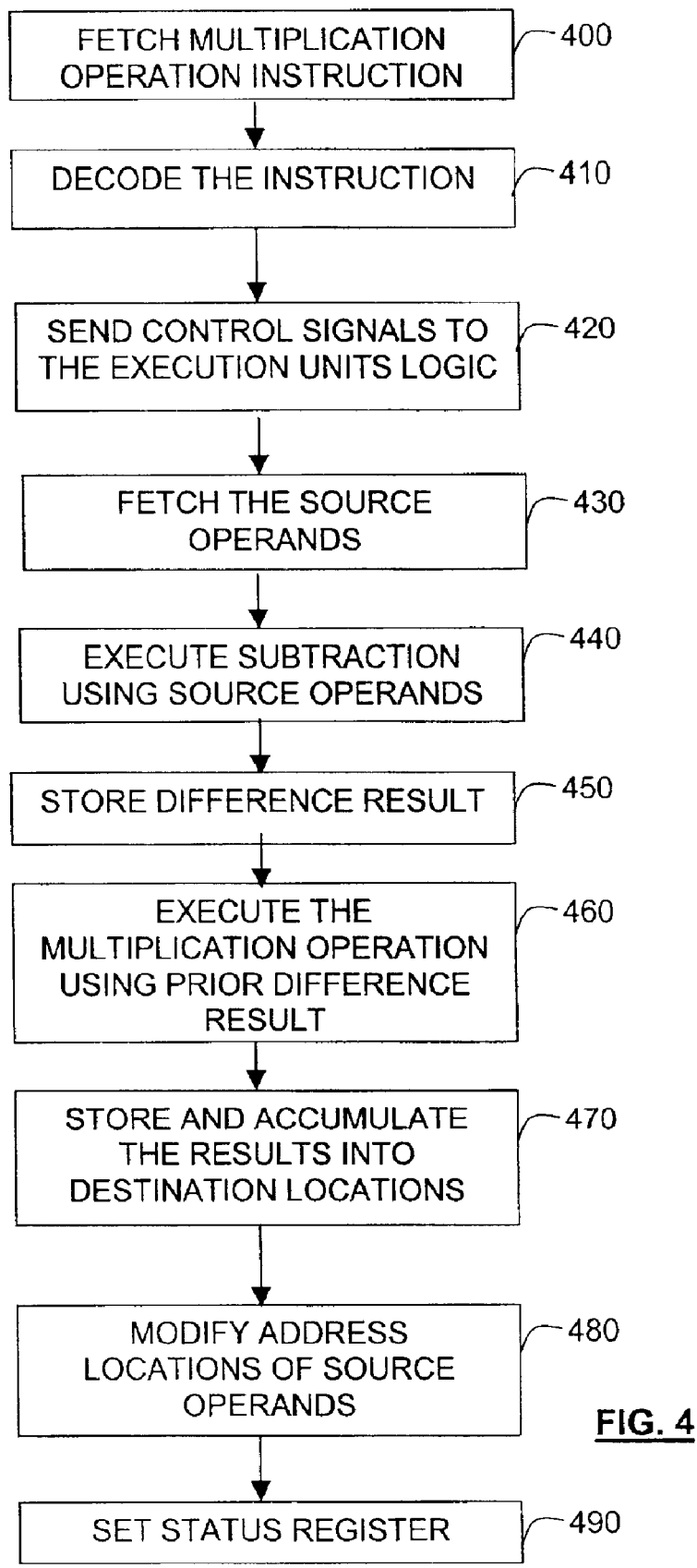
FIG. 4 depicts a method of processing mathematical operation instructions according to embodiments of the present invention.

FIG. 4 depicts a method of processing mathematical operation instructions, such as Euclidean Distance operation instructions, and is best understood when viewed in combination with FIG. 3. Referring to FIG. 4, in step 400, the processor fetches a mathematical operation instruction from the program memory 300. Then in step 410, the instruction decoder 320 decodes the mathematical operation instruction. The mathematical operation instruction may specify a register containing a source multiplication source operand for a square operation, a target accumulator to output the square of the square operation, registers containing the addresses of a minuend and subtrahend operands in the memory for a difference operation, a register to output the difference of the difference operation and an accumulator for a writeback operation.

In step 420, the processor causes control signals to be sent to the ALU logic and DSP logic. The control signals sent are based on bits in the mathematical operation instruction. The control signals indicate the locations of source operands in data memory 355 and registers 345, the destination locations for outputs and the mathematical operations to perform on the source operands. In step 430, the ALU unit 325a and DSP unit 325b fetch source operands from registers 345 or the data memory 355, as specified by source register bits in the mathematical operation instruction. In step 440, the processor may execute a subtraction operation according to the decoded mathematical operation instruction using the source operands to obtain a difference output from the ALU unit 325a. In step 450, the ALU unit stores the difference output to a difference register 345 for use in a multiplication operation according to a subsequently decoded mathematical operation instruction. In step 460, the processor may execute a multiplication operation according to the decoded mathematical operation instruction using the source operands to obtain a square output from the DSP unit 325b. In step 470, the DSP unit accumulates the square output to a target accumulator 360, as specified by destination bits in the mathematical operation instruction. In step 480, address locations of source operands for the subsequent mathematical operation instruction are modified. In step 490, the status register may be set indicating the overflow and saturation status of the target accumulator.

While specific embodiments of the present invention have been illustrated and described, it will be understood by those having ordinary skill in the art that changes may be made to those embodiments without departing from the spirit and scope of the invention.

What is claimed is:

1. A method of processing a multiplication operation instruction, comprising:

fetching and decoding a multiplication operation instruction;

executing the multiplication operation instruction on a multiplication source operand to generate a square of the multiplication source operand, wherein the multiplication source operand is contained in a multiplication operand source register specified in the multiplication operation instruction;

generating a difference output between a minuend source operand and a subtrahend source operand, wherein the minuend source operand and the subtrahend source operand are fetched during execution of a preceding multiplication operation instruction;

storing the difference output in a difference register specified in the multiplication operation instruction; and storing a result output in a target accumulator specified in the multiplication operation instruction;

wherein the multiplication source operand is transferred directly from the multiplication operand source register to a multiplication execution unit for immediate generation of the square output for the multiplication source operand.

2. The method according to claim 1, wherein the multiplication operation instruction specifies a first source register, the first source register containing an address for the minuend source operand, wherein the minuend source operand is transferred directly from the address to an arithmetic execution unit for immediate generation of the difference output.

3. The method according to claim 2, wherein the multiplication operation instruction specifies a second source register, the source register containing an address for the subtrahend source operand, wherein the subtrahend source operand is transferred directly from the address to an arithmetic execution unit for immediate generation of the difference output.

4. The method according to claim 3, wherein the multiplication operation instruction is a Euclidean Distance operation.

5. The method according to claim 4, wherein the result output is the square of the multiplication source operand.

6. The method according to claim 3, wherein the multiplication operation instruction is an Euclidean Distance Accumulate operation.

7. The method according to claim 6, wherein the step of executing the multiplication operation instruction includes the step of adding the square of the multiplication source operand to an addition source operand, the addition source operand contained in the target accumulator specified in the multiplication operation instruction.

8. The method according to claim 7, wherein the result output is the sum of the square of the multiplication source operand and the addition source operand.

9. The method according to claim 7, wherein the step of executing the multiplication operation instruction includes modifying the address contained in the first source register to contain an address for a next minuend operand for computing a difference during execution of a subsequent multiplication operation instruction.

10. The method according to claim 9, wherein the step of executing the multiplication operation instruction includes modifying the address contained in the second source register to contain an address for a next subtrahend operand for computing the difference during execution of the subsequent multiplication operation instruction.

11. The method according to claim 1, further comprising setting an accumulator status flag.

12. A processor for multiplication operation instruction processing, comprising:

a program memory for storing instructions including a multiplication operation instruction;

a program counter for identifying current instructions for processing;

a Digital Signal Processing unit (DSP) for executing instructions within the program memory, the DSP including DSP logic for executing the multiplication operation instruction on a multiplication source operand to generate a square of the multiplication source operand, the multiplication source operand contained in a multiplication source operand register specified in the multiplication operation instruction;

an arithmetic logic unit (ALU) for executing the instructions within the program memory, the ALU including ALU logic for executing the multiplication operation instruction on a minuend source operand and a subtrahend source operand to generate a difference output that is stored in a difference resister specified in the multiplication operation instruction, wherein the minuend source operand and the subtrahend source operand are fetched during execution of a preceding multiplication operation instruction; and a target accumulator for storing a result output, the target accumulator specified in the multiplication operation instruction;

wherein the multiplication source operand is transferred directly from the multiplication operand register to a multiplication execution unit for immediate generation of the square of the multiplication source operand.

13. The processor according to claim 12, further comprising a first Source register containing the address of the minuend source operand, the first source register specified in the multiplication operation instruction, wherein the minuend source operand is transferred directly from the address to an arithmetic execution unit for immediate generation of the difference.

14. The processor according to claim 13, further comprising a second source register containing the address of the subtrahend source operand, the second source register specified in the multiplication operation instruction, wherein the subtrahend source operand is transferred directly from the address to an arithmetic execution unit for immediate generation of the difference.

15. The processor according to claim 14, wherein the multiplication operation instruction is an Euclidean Distance operation.

16. The processor according to claim 15, wherein the result output is the square of the multiplication source operand.

17. The processor according to claim 16, wherein the multiplication operation instruction is an Euclidean Distance Accumulate operation.

18. The processor according to claim 17, further comprising the ALU for adding an addition source operand to the square of the multiplication source operand; the addition source operand contained in the target accumulator specified in the multiplication operation instruction.

19. The processor according to claim 18, wherein the result output is the sum of the square of the multiplication source operand and the addition source operand.

20. The processor according to claim 12, further comprising an arithmetic logic unit (ALU) for modifying a value contained in a first source register to an address of a minuend operand used for computing a difference during execution of a subsequent multiplication operation instruction.

21. The processor according to claim 20, further comprising modifying with the ALU a value contained in a second source register to an address of a subtrahend operand used for computing the difference during execution of the subsequent multiplication operation instruction.

22. The processor according to claim 12, further comprising a status register for indicating accumulator status.

* * * * *